US012639244B2

(12) United States Patent (10) Patent No.: US 12,639,244 B2
Diaz et al. (45) Date of Patent: May 26, 2026

(54) SUPPORTING MULTIPLE CONTROLLER CIRCUITS ON A MULTIPLEXED COMMUNICATION BUS

(71) Applicant: Xilinx, Inc., San Jose, CA (US)

(72) Inventors: Martin Diaz, San Jose, CA (US);
Carsten Hoffmann, Santa Cruz, CA
(US); Jerome Dale Wong, Sunnyvale,
CA (US)

(73) Assignee: Xilinx, Inc., San Jose, CA (US)

( * ) Notice: Subject to any disclaimer, the term of this
patent is extended or adjusted under 35
U.S.C. 154(b) by 299 days.

(21) Appl. No.: 18/148,699

(22) Filed: Dec. 30, 2022

(65) Prior Publication Data

US 2024/0220436 A1 Jul. 4, 2024

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01)

(58) Field of Classification Search
CPC .......................... G06F 13/4282; G06F 13/4022
See application file for complete search history.

(56) References Cited

U.S. PATENT DOCUMENTS

| | | | | | |
|---|---|---|---|---|---|
| 5,638,527 | A | * | 6/1997 | Parks | G06F 12/0284 |
| | | | | | 711/E12.013 |
| 6,151,297 | A | * | 11/2000 | Congdon | H04L 9/40 |
| | | | | | 370/216 |
| 8,176,532 | B1 | * | 5/2012 | Cook | H04L 63/10 |
| | | | | | 726/13 |
| 2006/0253619 | A1 | * | 11/2006 | Torudbakken | G06F 13/4022 |
| | | | | | 710/31 |
| 2013/0151750 | A1 | * | 6/2013 | Kanigicherla | G06F 13/4022 |
| | | | | | 710/313 |
| 2015/0278142 | A1 | * | 10/2015 | Davis | G06F 13/4282 |
| | | | | | 710/313 |
| 2015/0347336 | A1 | * | 12/2015 | Uekuri | G06F 1/3206 |
| | | | | | 710/316 |
| 2016/0188511 | A1 | * | 6/2016 | Muraoka | G06F 13/4282 |
| | | | | | 710/110 |
| 2017/0212859 | A1 | * | 7/2017 | Moses | G06F 13/1689 |
| 2018/0246833 | A1 | * | 8/2018 | Bai | G06F 3/0665 |
| 2020/0280551 | A1 | * | 9/2020 | Wallrabenstein | H04L 63/0428 |
| 2021/0357347 | A1 | * | 11/2021 | Li | G06F 13/4022 |
| 2023/0161726 | A1 | * | 5/2023 | Zhu | G06F 13/4221 |
| | | | | | 710/313 |

* cited by examiner

*Primary Examiner* — Phong H Dang
(74) *Attorney, Agent, or Firm* — Kevin T. Cuenot

(57) ABSTRACT

A system includes a plurality of controller circuits. The
system includes a plurality of target circuits. The system
includes a communication bus communicatively linking the
plurality of controller circuits with the plurality of target
circuits. The communication bus includes a plurality of
switches. Each switch of the plurality of switches is con-
nected to a different one of the plurality of controller circuits.

12 Claims, 4 Drawing Sheets

200

300

301

300

301

600

SUPPORTING MULTIPLE CONTROLLER CIRCUITS ON A MULTIPLEXED COMMUNICATION BUS

TECHNICAL FIELD

This disclosure relates to integrated circuits (ICs) and, more particularly, to supporting multiple controller or master circuits on a multiplexed communication bus.

BACKGROUND

An Inter-Integrated Circuit (I2C) bus is a communication bus often used to connect multiple embedded systems (e.g., ICs) on a printed circuit board. An I2C bus is implemented as a synchronous, multi-controller (master)/multi-target (slave), packet switched, single-ended, serial communication bus. An I2C bus has a compact and simplified implementation that utilizes two lines. These two lines include a serial data line (SDA line) used to convey data and a serial clock line (SCL) used to synchronize data transfers over the SDA line.

An I2C bus supports a 7-bit addressing scheme that allows up to 128 devices on the bus. Device addresses are typically set using pins of the devices on the bus. Not all devices, however, provide seven pins to support the full 7-bit addressing scheme. Some devices, for example, may only provide two address pins which reduces the range of possible addresses down to four, thereby significantly limiting the number of such devices that may be placed on the same I2C bus. In the case where the number of such devices exceeds four, for example, addresses would be duplicated causing a conflict on the I2C bus. Where an insufficient number of addresses are available to support all of the devices on the I2C bus, whether due to exceeding the 128 addresses available or due to having multiple devices with limited address capabilities owing to the devices having a reduced address pin set, an I2C multiplexer may be included to multiplex the communication bus.

An I2C multiplexer provides multiple output ports. Each output port supports a branch on which one or more devices may be placed. Those devices with same addresses may be placed on different output ports (e.g., branches) of the I2C multiplexer. In a system having a multiplexed I2C bus that includes multiple controller circuits, a race condition may occur since the I2C multiplexer does not provide atomic operation. Though described in connection with an I2C bus, this type of race condition is not confined to I2C buses and may occur with other multiplexed buses.

An example of a race condition is where a first controller circuit programs the multiplexer to access a particular output port. While the first controller circuit is carrying out a transaction with a target circuit connected to the selected output port of the multiplexer, a second and different controller circuit may program the multiplexer to access a different output port of the multiplexer. Thus, any data provided from the first controller circuit to the multiplexer in continuing with the transaction subsequent to the multiplexer having been programmed by the second controller circuit will be routed to the wrong output port of the multiplexer and, as such, to the wrong target circuit. Data from the first controller circuit will be routed to the output port that was desired or selected by the second controller circuit One approach for avoiding race conditions as described includes reducing the size of the design so that each controller circuit has its own set of devices thereby negating the need for multiplexing. This is not always possible. Another approach for avoiding race conditions is granting only one selected controller circuit access to the bus so that other controller circuits must proxy through the selected controller circuit. This approach, however, defeats safety requirements relating to independence. Another approach for avoiding race conditions includes implementing a mutex system that allows only one controller circuit to access the bus at a time. This approach, however, creates a dependence on the particular controller circuit that manages the mutex.

SUMMARY

In one or more example implementations, a system includes a plurality of controller circuits. The system includes a plurality of target circuits. The system includes a communication bus communicatively linking the plurality of controller circuits with the plurality of target circuits. The communication bus includes a plurality of switches. Each switch of the plurality of switches is connected to a different one of the plurality of controller circuits.

The foregoing and other implementations can each optionally include one or more of the following features, alone or in combination. Some example implementations include all the following features in combination.

In some aspects, a one-to-one correspondence exists between the plurality of controller circuits and the plurality of switches.

In some aspects, each target circuit is connected to each switch of the plurality of switches.

In some aspects, one or more or all of the switches may be configurable to disconnect one or more or all of their respective output ports (and any target circuits coupled to such output ports) when not in use.

In some aspects, each switch includes a plurality of output ports and is programmable to connect an input port of the switch with a selected output port of the plurality of output ports.

In some aspects, for each switch of the plurality of switches, target circuits having a same address are connected to different output ports.

In some aspects, the plurality of controller circuits, the plurality of switches, and the plurality of target circuits are disposed on a same circuit board.

In some aspects, the communication bus is an inter-integrated circuit (I2C) bus.

In some aspects, the communication bus is a Serial Peripheral Interface (SPI) bus.

In some aspects, the communication bus is a Control Area Network (CAN) bus.

In some aspects, each controller circuit programs only the switch connected thereto.

In some aspects, the plurality of controller circuits are included in a same integrated circuit.

In some aspects, one or more of the plurality of controller circuits are processors.

In some aspects, one or more of the plurality of controller circuits are circuits implemented in programmable logic.

In some aspects, at least one of the plurality of controller circuits is configured to cache a last configuration used to program the switch connected thereto.

In one or more example implementations, a system includes a plurality of controller circuits. The system includes a plurality of target circuits. The system includes a communication bus communicatively linking the plurality of controller circuits with the plurality of target circuits. The communication bus includes a plurality of switches including a first switch connected to two or more first controller circuits of the plurality of controller circuits and a second switch coupled to an output of the first switch and one or more second controller circuits of the plurality of controller circuits. Each switch of the plurality of switches includes input arbitration circuitry.

The foregoing and other implementations can each optionally include one or more of the following features, alone or in combination. Some example implementations include all the following features in combination.

In some aspects, the second switch is coupled to each of the plurality of target circuits.

In some aspects, the second switch is directly connected to the output of the first switch.

In some aspects, the communication bus includes one or more serially connected intervening switches disposed between the first switch and the second switch. Each intervening switch has a first input port connected to an output port of a prior switch and a second input port connected to one or more third controller circuits of the plurality controller circuits.

In some aspects, each switch of the plurality of switches other than the first switch is connected to one controller circuit.

In some aspects, the plurality of controller circuits, the plurality of switches, and the plurality of target circuits are disposed on a same circuit board.

In some aspects, the communication bus is an inter-integrated circuit (I2C) bus.

In some aspects, the communication bus is a Serial Peripheral Interface (SPI) bus.

In some aspects, the communication bus is a Control Area Network (CAN) bus.

In some aspects, one or more or all of the switches may be configurable to disconnect one or more or all of their respective output ports (and any target circuits coupled to such output ports) when not in use.

In one or more example implementations, a system includes a plurality of controller circuits. The system includes a plurality of target circuits. The system includes a communication bus communicatively linking the plurality of controller circuits with the plurality of target circuits. The communication bus includes a plurality of switches including a first switch connected to two or more first controller circuits of the plurality of controller circuits, a second switch coupled two or more second controller circuits of the plurality of controller circuits, and a third switch coupled to the first switch, the second switch, and each of the plurality of target circuits. Each switch of the plurality of switches includes input arbitration circuitry.

The foregoing and other implementations can each optionally include one or more of the following features, alone or in combination. Some example implementations include all the following features in combination.

In an aspect, the third switch is connected only to an output of the first switch and an output of the second switch.

In some aspects, one or more or all of the switches may be configurable to disconnect one or more or all of their respective output ports (and any target circuits coupled to such output ports) when not in use.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to supporting multiple controller circuits on a multiplexed communication bus. In accordance with the inventive arrangements described within this disclosure, methods and systems are disclosed that allow multiple controller circuits to exist on a multiplexed communication bus while avoiding race conditions that may arise due to the multiplexing. An example of a communication bus that may be used with the example implementations described herein is an inter-integrated circuit (I2C) bus. It should be appreciated that while an I2C bus is used for purposes of illustration, the inventive arrangements may be applied to other types of buses including, but not limited to, a Serial Peripheral Interface (SPI) bus, a Control Area Network (CAN) bus, or the like. Appreciably, a CAN bus is a two-wire serial bus while an SPI bus is a 4-wire serial bus.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
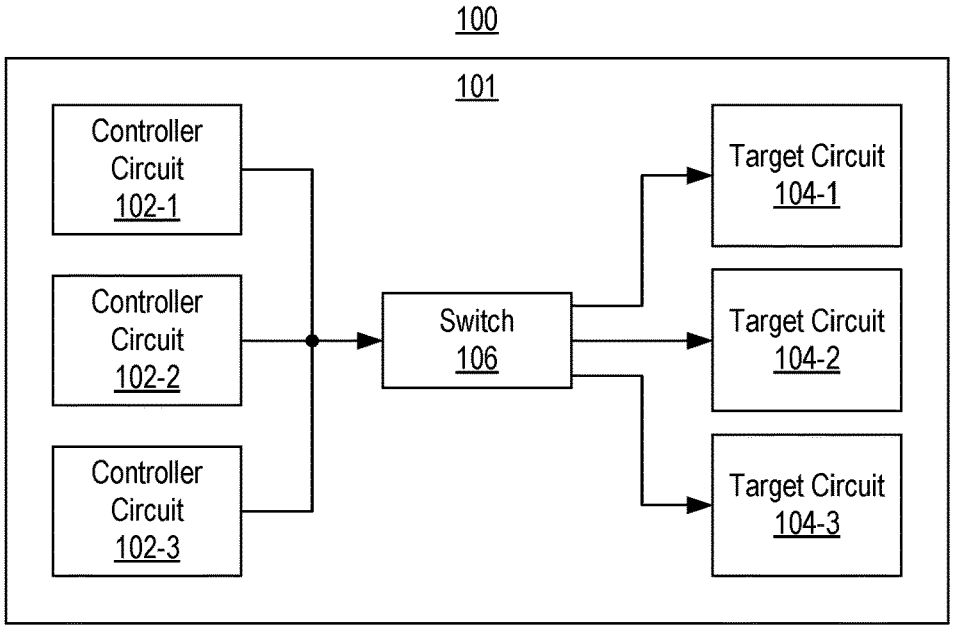
FIG. 1 illustrates an example of a conventional system having a multiplexed communication bus.

FIG. 1 illustrates an example of a conventional system 100 having a multiplexed communication bus. System 100 may be implemented as any of a variety of electronic systems that may include a circuit board 101. Circuit board 101 comprises a plurality of components, e.g., ICs, disposed thereon. As an example, circuit board 101 may have a form factor of a card installed within a data processing system or incorporated into another, larger electronic system.

In the example, system 100 includes a plurality of controller circuits 102-1, 102-2, and 102-3 disposed on circuit board 101. Controller circuits 102 are coupled to target circuits 104-1, 104-2, and 104-3 through a switch 106. In one aspect, switch 106 is implemented as a multiplexer. In an example implementation where the communication bus is implemented as an I2C bus, switch 106 may be implemented as an I2C multiplexer IC.

In the example, each of controller circuits 102 is connected to a same input port of switch 106. Switch 106 includes a plurality of output ports to which different ones of target circuits 104 are connected. Each output port may support a branch of the communication bus to which one or more target circuits may be connected. Accordingly, within this disclosure, the terms "output port" and "branch" may be used interchangeably since each output port supports only one branch. With the multiplexed implementation shown, multiple target circuits may be connected to a same output port (e.g., be located on a same branch) of switch 106 so long as the target circuits on the same branch have different addresses. Target circuits 104 having same addresses are connected to different output ports such that each target circuit 104 on a same branch has a unique address.

For example, two or more of target circuits 104-1, 104-2, and/or 104-3 may have the same address that is established by pins of the device. In this regard, the address may not be changeable. Moreover, as noted, the available pins for specifying an address may be limited to fewer than the maximum available thereby limiting the range of possible addresses each target circuit 104 may be assigned. Inclusion of switch 106 allows target circuits 104 having the same address to be placed on different output ports or branches to contend with addressing conflicts on the communication bus.

For purposes of illustration, target circuits 104 may represent any of a variety of different types of ICs. Examples of target circuits 104 may include, but are not limited to, one or more power management ICs, one or more power measurement ICs, general purpose input/output (I/O) expansion ICs, system monitor ICs, memories such as Electrically Erasable Programmable Read Only Memories (EEPROMS), and the like. Further, each target circuit 104 shown may represent a plurality of ICs on the same branch of the multiplexed bus.

In operation, each controller circuit 102 may communicate with each of target circuits 104 by programming switch 106 to do so. In illustration, in the case where controller circuit 102-1 is to communicate with target circuit 104-1, controller circuit 102-1 programs switch 106 to connect the input port of switch 106 with the output port of switch 106 to which target circuit 104-1 is connected. In the case where controller circuit 102-1 is to communicate with target circuit 104-2, controller circuit 102-1 programs switch 106 to connect the input port of switch 106 with the output port of switch 106 to which target circuit 104-2 is connected, and so forth.

In the example of FIG. 1, arbitration between controller circuits 102 is provided by the communication bus standard itself. That is, each of controller circuits 102 may be configured to observe the arbitration rules of the particular communication protocol used on the bus. In this example, the communication bus is an I2C bus. Thus, switch 106 does not require arbitration on the input port despite being connected to more than one controller circuit 102.

In the example of FIG. 1, switch 106 has an address. Each controller circuit 102 accesses switch 106 using the address. Each controller circuit 102, for example, may implement a transaction, e.g., a read or a write of a target circuit 104, in several phases. In a first phase, the controller circuit 102 that is accessing switch 106 first writes switch 106 and programs the switch to read or write via particular output port of switch 106. In a second phase, controller circuit 102 initiates the read or write with respect to the target circuit 104 by addressing behind switch 106 (e.g., by providing the read or write to switch 106 with an address of the desired target circuit 104 so that switch 106 passes the read or write transaction, including the specified address, out from the designated output port to the desired target circuit 104).

The communication bus implementation of FIG. 1 does not support atomic operation. The two phases of the transaction are not atomic in that other controller circuits 102 may intervene between the two phases. That is, the two phases may be interrupted by other controller circuits 102. For example, prior to controller circuit 102-1 completing a transaction with target circuit 104-1 on output port 1, another controller circuit such as controller circuit 102-2 may program switch 106 to select output port 2 (e.g., where controller circuit 102-2 wishes to communicate with target circuit 104-2). With controller circuit 102-2 reprogramming switch 106 prior to the conclusion of the transaction initiated by controller circuit 102-1, at the time controller circuit 102-1 sends further data to complete the transaction with target circuit 104-1, switch 106 is in the wrong state and the data is sent to output port 2 (e.g., to target circuit 104-2) thereby causing an error (e.g., race) condition.

Figure 2:
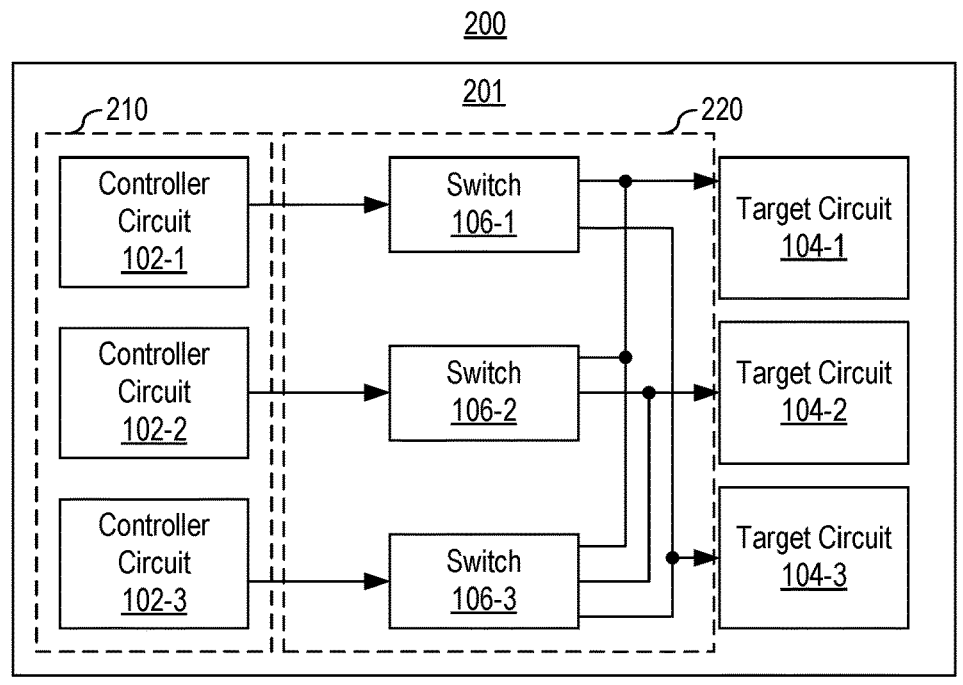
FIG. 2 illustrates an example of a system having a multiplexed communication bus in accordance with the inventive arrangements disclosed herein.

FIG. 2 illustrates an example of a system 200 having a multiplexed communication bus in accordance with the inventive arrangements disclosed herein. System 200 may be implemented as any of a variety of electronic systems that may include a circuit board 201. Circuit board 201 comprises a plurality of components, e.g., ICs, disposed thereon. As an example, circuit board 201 may have a form factor of a card installed within a data processing system or incorporated into another, larger electronic system.

In the example, communication bus 220 communicatively links the plurality of controller circuits 102 with the plurality of target circuits 104. As shown, system 200 includes a plurality of controller circuits 102-1, 102-2, and 102-3 disposed on circuit board 201. In one example implementation, controller circuits 102 may be included within a single IC package 210. In one or more other examples, controller circuits 102 may be implemented in two or more different IC packages. Controller circuits 102 are coupled, e.g., communicatively linked, to target circuits 104-1, 104-2, and 104-3 through a plurality of switches 106-1, 106-2, and 106-3. In the example, there is a one-to-one correspondence between controller circuits 102 and switches 106. That is, each controller circuit 102 has a single, dedicated switch 106 and is connected to that dedicated switch 106.

In one aspect, each switch 106 is implemented as a multiplexer. In an example implementation where communication bus 220 is implemented as an Inter-Integrated Circuit (I2C) bus, each switch 106 may be implemented as an I2C multiplexer IC. In an example where communication bus 220 is implemented as an SPI bus, switch 106 may be implemented as an SPI multiplexer. In an example where communication bus 220 is implemented as a CAN bus, switch 106 may be implemented as a CAN multiplexer.

In the example, target circuit 104-1 is connected to switch 106-1, 106-2, and switch 106-3. Target circuit 104-2 is connected to switch 106-2 and switch 106-3. Target circuit 104-3 is connected to switch 106-1 and switch 106-3. In other examples, depending on the particular design of system 200, each target circuit 104 may be connected to each switch 106. In one or more other examples, depending on the particular design of system 200, a target circuit 104 may be connected to a single switch 106 while the other target circuits 104 are connected to two or more switches 106.

For purposes of illustration, target circuits 104 may represent any of a variety of different types of ICs. Examples of target circuits 104 may include, but are not limited to, one or more power management ICs, one or more power measurement ICs, general purpose I/O expansion ICs, system monitor ICs, memories such as EEPROMS, and the like. Further, each target circuit 104 shown may represent a plurality of ICs on the same branch of the multiplexed bus.

The example of FIG. 2 illustrates a case where each controller circuit 102 has a dedicated switch 106. Each switch 106 need only include a single input port. If more input ports are available, such input ports need not be used as each controller circuit 102 is connected to a single switch 106. Each switch 106 includes a plurality of distinct or separate and independent output ports. Each switch 106 is configured or programmed only by the particular controller circuit 102 connected thereto to select the particular output port or branch over which data provided from the controller circuit 102 is to be output. Each controller circuit 102 is capable of programming the switch 106 connected thereto to choose which of the distinct output ports of the switch 106 is connected to the input port and, as such, used to convey data to a coupled target circuit 104.

For example, controller circuit 102-1 programs switch 106-1 to connect the input port of switch 106-1 to output port 1 of switch 106-1 to communicate with target circuit 104-1 or programs switch 106-1 to connect the input port of switch 106-1 to output port 2 of switch 106-1 to communicate with target circuit 104-3. Controller circuit 102-2 programs switch 106-2 to connect the input port of switch 106-2 to output port 1 of switch 106-2 to communicate with target circuit 104-1 or programs switch 106-2 to connect the input port of switch 106-2 with output port 2 of switch 106-2 to communicate with target circuit 104-2. Controller circuit 102-3 programs switch 106-3 to connect the input port of switch 106-3 to output port 1 of switch 106-3 to communicate with target circuit 104-1, or programs switch 106-3 to connect the input port of switch 106-3 with output port 2 of switch 106-3 to communicate with target circuit 104-2, or programs switch 106-3 to connect the input port of switch 106-3 with output port 3 of switch 106-3 to communicate with target circuit 104-3. In the example of FIG. 2, switches 106 do not require arbitration on the input port as each switch 106-1 is connected to only a single controller circuit 102. Thus, in one or more example implementations, switches 106 omit or lack input arbitration circuitry.

In one or more example implementations, one or more or all of switches 106 may be configurable to disconnect one or more or all of their respective output ports (and any target circuits coupled to such output ports) when not in use. For example, in programming a switch 106 to connect the input port to a selected output port, the other output ports of the switch 106 (e.g., the unselected output ports) may be disconnected from the input port. In the case where a switch 106 is not used at all, each of the output ports of the switch may be disconnected from the input port of the switch 106.

The example of FIG. 2 addresses another known issue with certain systems that utilize a communication bus such as an I2C bus, an SPI bus, a CAN bus, or the like. In some cases, each controller circuit 102 may be configured to cache the particular configuration to which switch 106 was last programmed (e.g., the last configuration of the switch as programmed by the controller circuit 102). Referring again to the example of FIG. 1, in the case where controller circuit 102-1 programs switch 106 to communicate over output port 1, controller circuit 102-1 will cache that data so that the next time controller circuit 102-1 attempts to communicate over the bus, controller circuit 102-1 assumes that switch 106 is still programmed to access output port 1. This assumption can save time in cases where the controller circuit 102 continues communicating with the same target circuit 104 specified in the cached data. In that case, programming the switch 106 would be redundant and consume time, thereby increasing communication latency.

This assumption, however, does not account for the fact that another controller circuit 102 may have programmed switch 106 with different data to access a different output port. The embodiment of FIG. 2 allows controller circuits 102 to continue to cache the configuration of the particular switch to which each controller circuit 102 is connected since there is no possibility of another controller circuit 102 intervening and changing the programming of a switch belonging to another controller circuit 102. This capability allows communications to be conducted more efficiently with less latency since the switch connected to each respective controller circuit may not require programming for each transaction. The caching works as intended and is not corrupted by a race condition.

Figure 3:
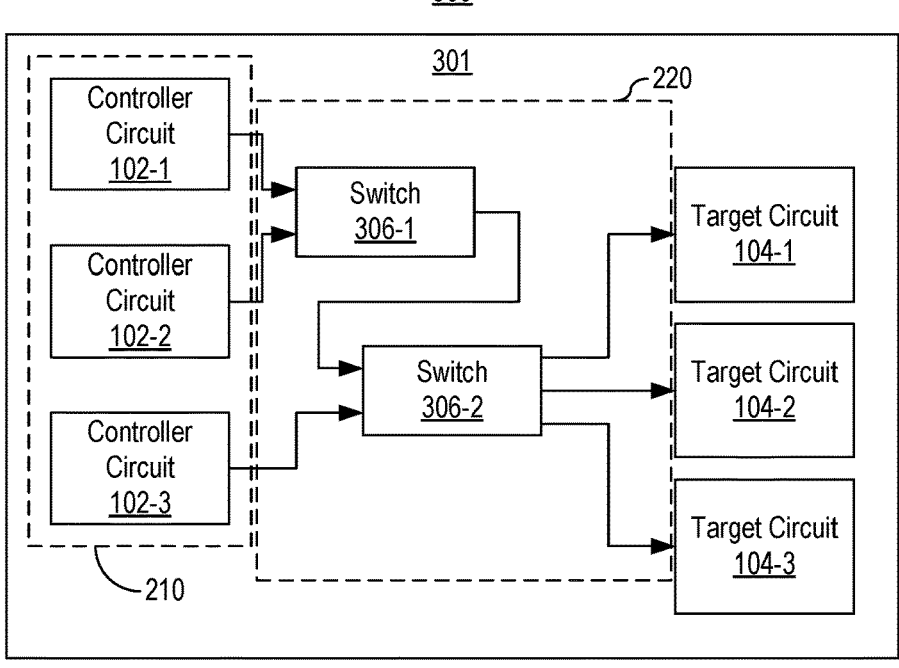
FIG. 3 illustrates another example of a system having a multiplexed communication bus in accordance with the inventive arrangements disclosed herein.

FIG. 3 illustrates an example of a system 300 having a multiplexed communication bus in accordance with the inventive arrangements disclosed herein. System 300 may be implemented as any of a variety of electronic systems that may include a circuit board 301. Circuit board 301 comprises a plurality of components, e.g., ICs, disposed thereon. As an example, circuit board 301 may have a form factor of a card installed within a data processing system or incorporated into another, larger electronic system.

In the example, system 300 includes a plurality of controller circuits 102-1, 102-2, and 102-3 disposed on circuit board 301. In one example implementation, controller circuits 102 may be included within a single IC package 210. In one or more other examples, controller circuits 102 may be implemented in two or more different IC packages. Controller circuits 102 are coupled, e.g., communicatively linked, to target circuits 104-1, 104-2, and 104-3 through communication bus 220. In the example of FIG. 3, communication bus 220 includes a plurality of switches 306-1 and 306-2. In the example, the number of switches 306 may be one less than the number of controller circuits. For example, given N controller circuits 102, the system will include N−1 switches 306. Switches 306 are organized in a tree structure. Switches 306 are also serially connected.

In the example, each switch 306 may be implemented as a multiplexer. In an example implementation where the communication bus is implemented as an I2C bus, each switch 306 may be implemented as an I2C multiplexer IC. For purposes of illustration, and not limitation, switches 306 may be implemented as a PCA9641 I2C multiplexer chip available from NXP™ Semiconductors N.V., of Eindhoven, Netherlands. In other examples, where communication bus 220 conforms to a different communication standard (e.g., SPI and/or CAN), switches 306 may be configured for use with such buses.

In the example of FIG. 3, each switch 306 includes a plurality of different input ports. In one aspect, each switch 306 includes two input ports. As such, each switch 306 includes arbitration circuitry capable of arbitrating between the plurality of different input ports of the switch 306.

In the example, controller circuit 102-1 is connected to a first input port of switch 306-1 while controller circuit 102-2 is connected to a second input port of switch 306-1. The output port of switch 306-1 is connected to a first input port of switch 306-2. As shown, the output port of switch 306-1 is only coupled to switch 306-2. In the example, the output port of switch 306-1 is connected to the first input port of switch 306-2. Switch 306-2, being the last switch in the chain of serially connected switches, is connected to each of target circuits 104-1, 104-2, and 104-3.

In the example of FIG. 3, the arbitration of each switch 306 allows one master circuit 102 at a time to control switch 306. Thus, one master circuit 102 is granted access or control while the other master circuit waits for access. Ultimately, the command from the master circuit 102 that is waiting will be executed albeit with a slightly longer wait. This behavior ensures that the multiplexing and the command provided to the target circuit 104 are atomic in nature.

In the example of FIG. 3, the hierarchy of switches 306 of communication bus 220 is due, at least in part, to the limited number of input ports available. In one or more examples, each switch 306 may include memory that stores the particular output port to which each input port is connected.

Any commands from controller circuits 102 carried through the hierarchy of switches 306 include the address of the target circuit 104 to which the command is to be delivered. In one aspect, the last switch 306 of the hierarchy that is connected to the respective target circuits 104 may utilize the address of the command from the master circuit 102 to determine which of the output ports of the switch 306 to select and connect to the input port of the switch 306 over which the command was received. In the example of FIG. 3, the input arbitration circuitry of the respective switches 306 determines access of controller circuits 102 rather than relying on the built-in prioritization of the particular bus protocol used (e.g., as described in connection with FIG. 1).

In one or more example implementations, one or more or all of switches 306 may be configurable to disconnect one or more or all of their respective output ports (and any target circuits coupled to such output ports) when not in use. For example, in programming a switch 306 to connect a particular input port to a selected output port, the other output ports of the switch 306 (e.g., the unselected output ports) may be disconnected from the particular input port (and/or disconnected from the other input port). In the case where a switch 306 is not used at all, each of the output ports of the switch may be disconnected from each of the input ports of the switch 306.

As discussed, for purposes of illustration, target circuits 104 may represent any of a variety of different types of ICs. Examples of target circuits 104 may include, but are not limited to, one or more power management ICs, one or more power measurement ICs, general purpose I/O expansion ICs, system monitor ICs, memories such as EEPROMS, and the like. Further, each target circuit 104 shown may represent a plurality of ICs on the same branch of the multiplexed bus.

Figure 4:
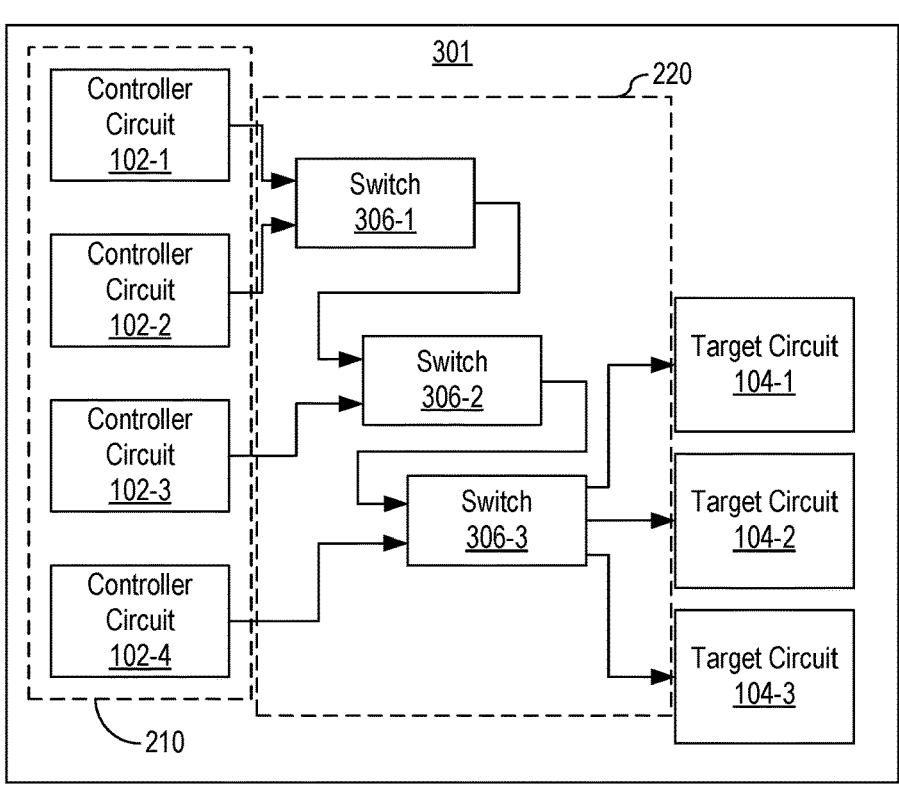
FIG. 4 illustrates another example of a system having a multiplexed communication bus including an intervening switch in accordance with the inventive arrangements disclosed herein.

FIG. 4 illustrates another example of system 300 having a multiplexed communication bus including one or more intervening switches in accordance with the inventive arrangements disclosed herein. The example of FIG. 4 is substantially similar to the example of FIG. 3 with switches 306 and the configuration of switches 306 being implemented as described (e.g., with respect to programming to connect input port(s) to output port(s) and/or disconnecting output ports).

In the example of FIG. 4, however, referring to communication bus 220, switch 306-2 is an intervening switch with the addition of switch 306-3 to accommodate the additional controller circuit 102-4. In the example of FIG. 4, like FIG. 3, the number of switches 306 is one less than the number of controller circuits 102. As illustrated, the output port of switch 306-2 is coupled only to a first input of switch 306-3. The output port of switch 306-2 is connected to the first input port of switch 306-3. Controller circuit 102-4 has an output that is connected to a second input port of switch 306-3. In the example, switch 306-3 has an output port connected to each of target circuits 104-1, 104-2, and 104-3.

As discussed, for purposes of illustration, target circuits 104 may represent any of a variety of different types of ICs. Examples of target circuits 104 may include, but are not limited to, one or more power management ICs, one or more power measurement ICs, general purpose I/O expansion ICs, system monitor ICs, memories such as EEPROMS, and the like. Further, each target circuit 104 shown may represent a plurality of ICs on the same branch of the multiplexed bus.

Figure 5:
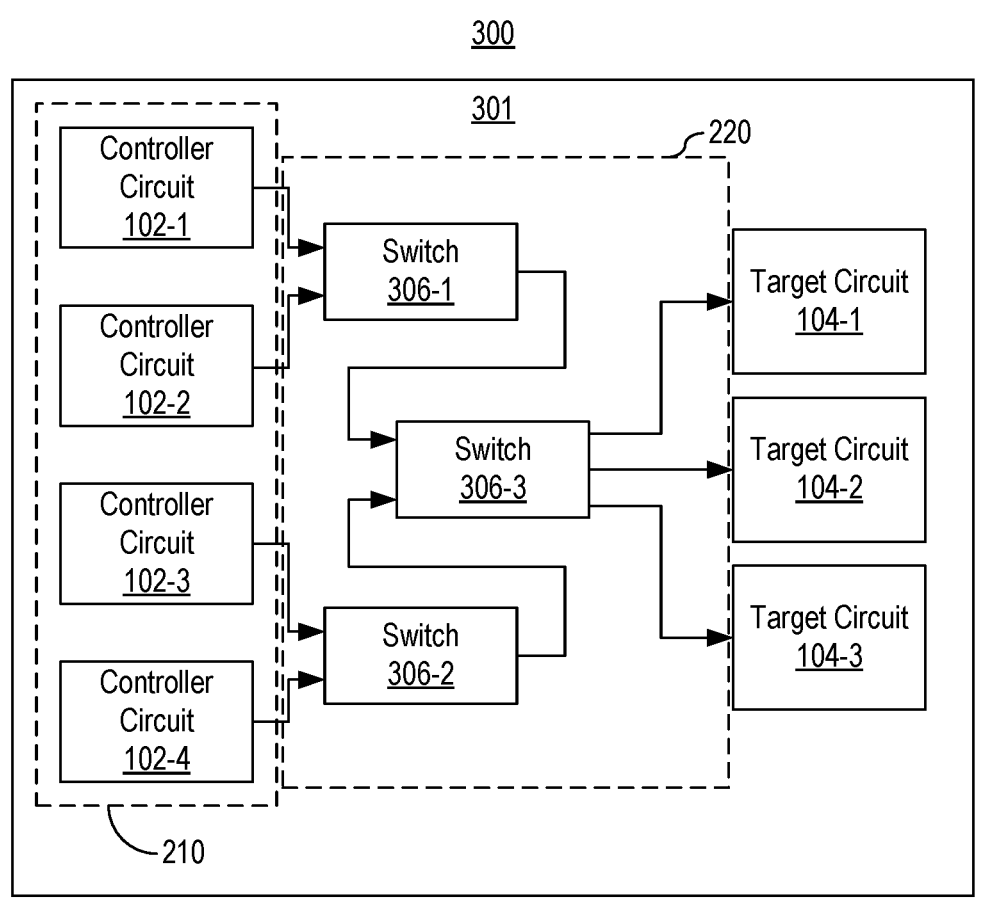
FIG. 5 illustrates another example of a system having a multiplexed communication bus in accordance with the inventive arrangements disclosed herein.

FIG. 5 illustrates another example of system 300 having a multiplexed communication bus in accordance with the inventive arrangements disclosed herein. In the example of FIG. 5, switches 306 and the configuration of switches 306 may be implemented as described in connection with FIG. 3 (e.g., with respect to programming to connect input port(s) to output port(s) and/or disconnecting output ports).

In the example of FIG. 5, with reference to communication bus 220, switch 306-1 has a first input port directly connected to an output port of controller circuit 102-1 and a second input port directly connected to an output port of controller circuit 102-2. Switch 306-2 has a first input port directly connected to an output port of controller circuit 102-3 and a second input port directly connected to an output port of controller circuit 102-4. The output port of switch 306-1 is coupled only to the first input of switch 306-3. The output port of switch 306-2 is coupled only to the second input of switch 306-3. In the example of FIG. 5, the number of switches 306 is still one less than the number of controller circuits 102. In the example, switch 306-3 has an output port connected to each of target circuits 104-1, 104-2, and 104-3.

As discussed, for purposes of illustration, target circuits 104 may represent any of a variety of different types of ICs. Examples of target circuits 104 may include, but are not limited to, one or more power management ICs, one or more power measurement ICs, general purpose I/O expansion ICs, system monitor ICs, memories such as EEPROMS, and the like. Further, each target circuit 104 shown may represent a plurality of ICs on the same branch of the multiplexed bus.

Figure 6:
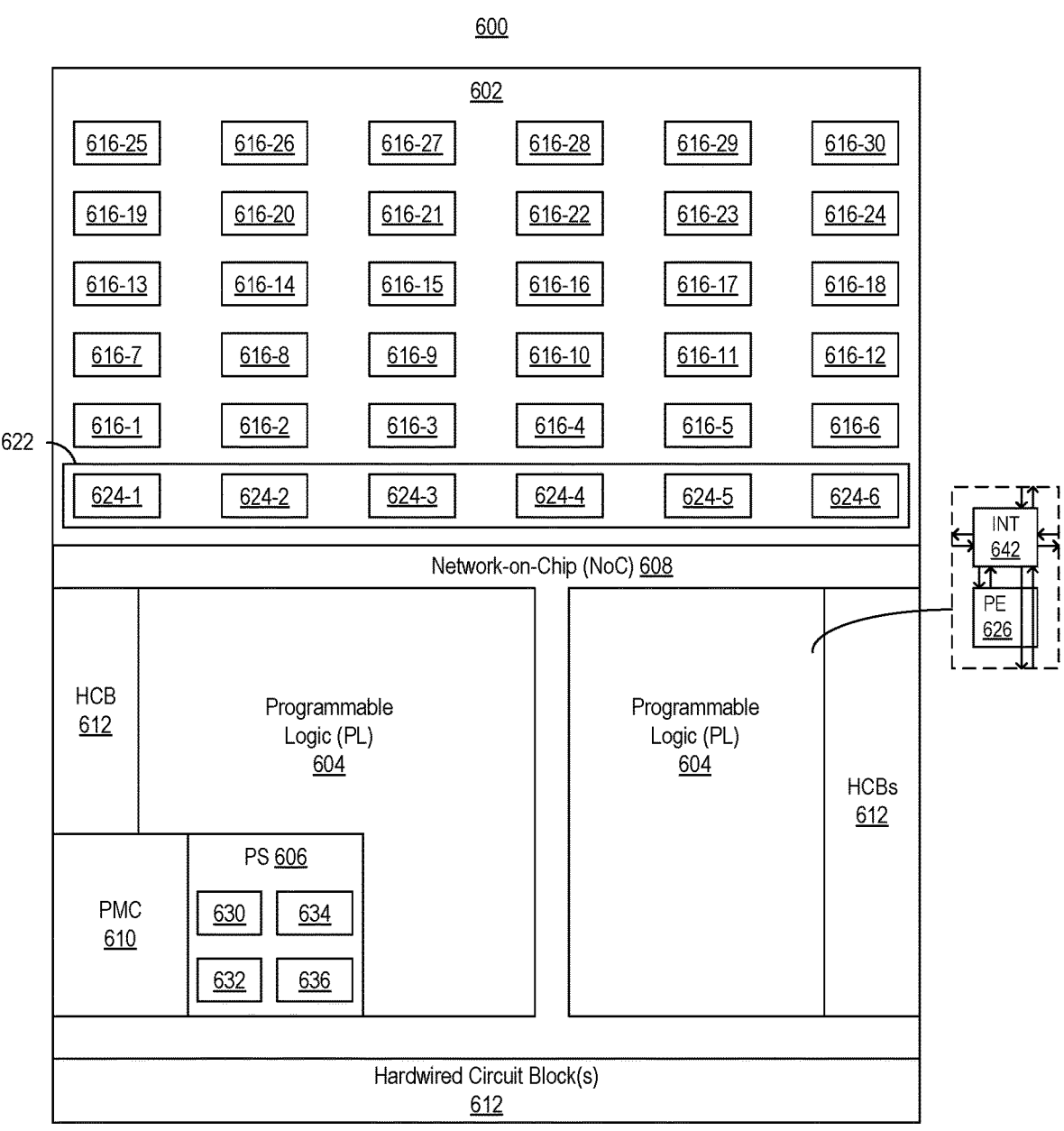
FIG. 6 illustrates an example architecture for a device that includes a plurality of controller circuits.

FIG. 6 illustrates an example architecture 600 for a device, e.g., an IC, that includes a plurality of controller circuits. Architecture 600 may be used to implement a programmable IC, an adaptive system, and/or a System-on-Chip (SoC). In the example of FIG. 6, architecture 600 is implemented on a single die provided within a single package. In other examples, architecture 600 may be implemented using a plurality of interconnected dies within a single package where the various resources of architecture 600 (e.g., circuits) illustrated in FIG. 6 are implemented across the different interconnected dies.

In the example, architecture 600 includes a plurality of different subsystems including a data processing array 602, programmable logic (PL) 604, a processor system (PS) 606, a Network-on-Chip (NoC) 608, a platform management controller (PMC) 610, and one or more hardwired circuit blocks 612.

Data processing array 602 is implemented as a plurality of interconnected and programmable compute tiles 616. Compute tiles 616 may be arranged in an array and are hardwired. Each compute tile 616 can include one or more cores and a memory module. In one example implementation, cores of compute tiles 616 may be implemented as custom circuits that do not execute program code.

In another example implementation, cores of compute tiles 616 are capable of executing program code stored in core-specific program memories contained within each respective core. As an example, a core of a compute tile 616 may be implemented as a vector processor capable of performing both fixed and floating-point operations and/or a scalar processor. Each compute tile 616 further includes a data memory (e.g., the memory module) and dedicated multi-bit data movement channels connecting the compute tiles 616. Each compute tile 616 further can include support for direct memory access (DMA) operations and locks to move data to and from other compute tiles 616. In one or more other example implementations, data processing array 602 may include one or more memory tiles that replace one or more of the compute tiles 616.

Data processing array 602 may be configured to form a plurality of clusters, where each cluster includes one or more compute tiles 616 and/or memory tiles. Compute tiles 616 and/or memory tiles in a same cluster may communicate with one another to implement/execute a particular application or accelerator. Clusters may operate in isolation from one another where each different cluster (e.g., accelerator) is capable of running a cluster-specific application (or different instance of an application run in another cluster). Each cluster operates as part of a domain of architecture 600.

It should be appreciated that the number of tiles, whether compute or memory, illustrated in FIG. 6 is for purposes of illustration. Data processing array 602 may include more tiles than shown where data processing array 602 includes more rows of tiles and/or more columns of tiles. For example, in some cases, data processing array 602 may include hundreds of tiles. In other examples, data processing array 602 may include fewer tiles than shown in FIG. 6.

Data processing array 602 includes an interface block 622 that connects tiles 616 or memory tiles to other resources of architecture 600. In the example of FIG. 6, interface block 622 includes a plurality of interconnected interface tiles 624 organized in a row. In one example, each of interface tiles 624 may have a same architecture. In another example, interface tiles 624 may be implemented with different architectures where each different interface tile architecture supports communication with different types of resources of architecture 600. Interface tiles 624 are connected so that data may be propagated from one interface tile 624 to another bi-directionally. Each interface tile 624 is capable of operating as an interface for the column of compute tiles 616 and/or memory tiles directly above.

PL 604 is circuitry that may be programmed to perform specified functions. As an example, PL 604 may be implemented as field programmable gate array type of circuitry. PL 604 can include an array of programmable circuit blocks. As defined herein, the term "programmable logic" means circuitry used to build reconfigurable digital circuits. Programmable logic is formed of many programmable circuit blocks that provide basic functionality. The topology of PL 604 is highly configurable unlike hardwired circuitry. In one aspect, each programmable circuit block of PL 604 includes a programmable element 626 (e.g., a functional element) and a programmable interconnect 642. The programmable interconnects 642 provide the highly configurable topology of PL 604. The programmable interconnects 642 may be configured on a per wire basis to provide connectivity among the programmable elements 626 of programmable circuit blocks of PL 604 and is configurable on a per-bit basis (e.g., where each wire conveys a single bit of information) unlike connectivity among compute tiles 616 and/or memory tiles in data processing array 602, for example.

Examples of programmable circuit blocks of PL 604 include configurable logic blocks having look-up tables and registers. Unlike hardwired circuitry described below and sometimes referred to as hardwired circuit blocks, these programmable circuit blocks have an undefined function at the time of manufacture. PL 604 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 604, are numerous and intermingled with the other programmable circuit blocks of PL 604. These circuit blocks may also have an architecture that generally includes a programmable interconnect 642 and a programmable element 626 and, as such, are part of the highly configurable topology of PL 604.

Prior to use, PL 604, e.g., the programmable interconnect and the programmable elements, must be programmed or "configured" by loading data referred to as a configuration bitstream into internal configuration memory cells therein. The configuration memory cells, once loaded with a configuration bitstream, define how PL 604 is configured, e.g., the topology, and operates (e.g., particular functions performed). Within this disclosure, a "configuration bitstream" is not equivalent to program code executable by a processor or computer. In FIG. 6, PL 604 may implement one or more circuit blocks therein that are configured to operate as master circuits 102.

PS 606 is implemented as hardwired circuitry that is fabricated as part of architecture 600. PS 606 may be implemented as, or include, any of a variety of different processor types each capable of executing program code. For example, PS 606 may be implemented as an individual processor, e.g., a single core capable of executing program code. In another example, PS 606 may be implemented as a multi-core processor. In still another example, PS 606 may include one or more cores, modules, co-processors, I/O interfaces, and/or other resources. PS 606 may be implemented using any of a variety of different types of architectures. Example architectures that may be used to implement PS 606 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

As noted, PS 606 may be implemented as, or include, any of a variety of different processor types each capable of executing program code. The processors may have different architectures and/or instruction sets. In the example, PS 606 includes various processors such as a real-time processing unit (RPU) 630, an application processing unit (APU) 632, a graphics processing unit (GPU) 634, a configuration and security unit (CSU) 636, and the like. Each of the processors is capable of executing program code. PS 606 also includes various support circuits (not shown), such as one or more of each of an on-chip memory, a transceiver, a peripheral, an interconnect, a DMA circuit, a memory controller, and a multiplexed input/output (MIO) circuit. The processors and the support circuits are interconnected by an interconnect (not shown). In the example of FIG. 6, RPU 630 and/or APU 632 may operate as a master circuit 102 depending on the configuration of architecture 600.

NoC 608 is a programmable interconnecting network for sharing data between endpoint circuits in architecture 600. The endpoint circuits can be disposed in DPE array 602, PL 604, PS 606, and/or selected hardwired circuit blocks 612. NoC 608 can include high-speed data paths with dedicated switching. In an example, NoC 608 includes one or more horizontal paths, one or more vertical paths, or both horizontal and vertical path(s). The arrangement and number of regions shown in FIG. 6 is merely an example. NoC 608 is an example of the common infrastructure that is available within architecture 600 to connect selected components and/or subsystems.

Nets that are to be routed through NoC 608 are unknown until a design is created for implementation within architecture 600. NoC 608 may be programmed by loading configuration data into internal configuration registers that define how elements within NoC 608 such as switches and interfaces are configured and operate to pass data from switch to switch and among the NoC interfaces to connect the endpoint circuits. NoC 608 is fabricated as part of architecture 600 (e.g., is hardwired) and, while not physically modifiable, may be programmed to establish connectivity between different master circuits and different slave circuits of a user circuit design. NoC 608, upon power-on, does not implement any data paths or routes therein. Once configured by a master circuit such as PMC 610, however, NoC 608 implements data paths or routes between endpoint circuits.

PMC 610 is responsible for managing architecture 600. PMC 610 is a subsystem within architecture 600 that is capable of managing the other programmable circuit resources across the entirety of architecture 600. PMC 610 is capable of maintaining a safe and secure environment, booting architecture 600, and managing architecture 600 during normal operations. For example, PMC 610 is capable of providing unified and programmable control over power-up, boot/configuration, security, power management, safety monitoring, debugging, and/or error handling for the different subsystems of architecture 600 (e.g., DPE array 602, PL 604, PS 606, and NoC 608). PMC 610 operates as a dedicated platform manager that decouples PS 606 and from PL 604. As such, PS 606 and PL 604 may be managed, configured, and/or powered on and/or off independently of one another. PMC 610 also may operate as a master circuit 102.

In one aspect, PMC 610 is capable of operating as a Root-of-Trust for the entirety of architecture 600. As an example, PMC 610 is responsible for authenticating and/or validating device images containing configuration data that may be loaded into architecture 600 for any of the programmable resources of architecture 600. PMC 610 further is capable of protecting architecture 600 against tampering during operation. By operating as the Root-of-Trust for architecture 600, PMC 610 is capable of monitoring operation of PL 604, PS 606, and/or any other programmable circuit resources that may be included in architecture 600. The Root-of-Trust capabilities, as performed by PMC 610, are distinct and separate from PS 606 and PL 604 and/or any operations performed by the PS 606 and/or PL 604.

In one aspect, PMC 610 may be implemented as a processor with dedicated resources. PMC 610 may include multiple redundant processors. The processors of PMC 610 are capable of executing firmware. Use of firmware supports configurability and segmentation of global features of architecture 600 such as reset, clocking, and protection to provide flexibility in creating separate domains (which are distinct from "power domains" that may be subsystem-specific).

Hardwired circuit blocks 612 are special-purpose circuit blocks fabricated as part of architecture 600. Though hardwired, hardwired circuit blocks 612 may be configured by loading configuration data into control registers to implement one or more different modes of operation. Examples of hardwired circuit blocks 612 may include input/output (I/O) blocks, transceivers for sending and receiving signals to circuits and/or systems external to architecture 600, memory controllers, or the like. Examples of different I/O blocks may include single-ended and pseudo differential I/Os. Examples of transceivers may include high-speed differentially clocked transceivers. Other examples of hardwired circuit blocks 612 include, but are not limited to, cryptographic engines, digital-to-analog converters (DACs), analog-to-digital converters (ADCs), and the like. In general, hardwired circuit blocks 612 are application-specific circuit blocks.

The various programmable circuit resources illustrated in FIG. 6 may be programmed initially as part of a boot process for architecture 600. During runtime, the programmable circuit resources may be reconfigured. In one aspect, PMC 610 is capable of initially configuring DPE array 602, PL 604, PS 606, and NoC 608. At any point during runtime, PMC 610 may reconfigure all or a portion of architecture 600. In some cases, PS 606 may configure and/or reconfigure PL 604 and/or NoC 608 once initially configured by PMC 610.

The inventive arrangements described herein, with reference to architecture 600 for example, provide a solution to scenarios in which one or more of the controller circuits described above, e.g., PMC 610 and/or the APU 632, take over the communication bus as a controller and program the switch in the communication bus causing a race condition as described.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "coupled" means that the two elements coupled are communicatively linked whether directly without any intervening elements or indirectly with one or more intervening elements. As defined herein, the term "connected" means that the two elements that are connected are communicatively linked without any intervening elements.

As defined herein, the term "responsive to" and similar language means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a plurality of controller circuits, wherein each controller circuit is a master circuit;
a plurality of target circuits, wherein each target circuit is a slave circuit; and
a communication bus communicatively linking the plurality of controller circuits with the plurality of target circuits, wherein the communication bus is a synchronous and serial communication bus;
wherein the communication bus includes a plurality of switches and each controller circuit is coupled to a single and different switch of the plurality of switches with a one-to-one correspondence;
wherein, for each switch of the plurality of switches, target circuits having a same address are connected to different output ports thereby alleviating addressing conflicts between the plurality of target circuits;
wherein each controller circuit programs only the switch connected thereto with a configuration that causes the switch to connect a selected output port of a plurality of output ports of the switch to a single input port of the switch; and
wherein each controller circuit caches the configuration used to program the switch to avoid redundant configuration of the switch for subsequent communications.

2. The system of claim 1, wherein each switch includes a plurality of output ports and is programmable to connect an input port of the switch with a selected output port of the plurality of output ports.

3. The system of claim 1, wherein the plurality of controller circuits, the plurality of switches, and the plurality of target circuits are disposed on a same circuit board.

4. The system of claim 1, wherein the communication bus is an inter-integrated circuit bus.

5. The system of claim 1, wherein the plurality of controller circuits are included in a same integrated circuit.

6. The system of claim 1, wherein one or more of the plurality of controller circuits are processors.

7. The system of claim 1, wherein one or more of the plurality of controller circuits are circuits implemented in programmable logic.

8. The system of claim 1, wherein at least one of the plurality of target circuits supports fewer addresses than the communication bus.

9. The system of claim 1, wherein the one-to-one correspondence avoids race conditions among the plurality of controller circuits.

10. The system of claim 1, wherein each switch is implemented as a multiplexer.

11. The system of claim 1, wherein the configuration further disconnects each non-selected output port of the plurality of output ports from the single input port.

12. The system of claim 1, wherein each controller circuit is capable of implementing atomic operation.

* * * * *